United States Patent
Kim et al.

(10) Patent No.: US 11,613,158 B2
(45) Date of Patent: Mar. 28, 2023

(54) AIR CONDITIONER FOR VEHICLE

(71) Applicant: Hanon Systems, Daejeon (KR)

(72) Inventors: Jong Su Kim, Daejeon (KR); Seong Seok Han, Daejeon (KR); Jeong Jae Lee, Daejeon (KR); Hyung Joo Kim, Daejeon (KR); Hun Sang Lee, Daejeon (KR); Heon Hur, Daejeon (KR); Beom Ki Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/852,428

(22) Filed: Jun. 29, 2022

(65) Prior Publication Data

US 2022/0324289 A1 Oct. 13, 2022

Related U.S. Application Data

(63) Continuation of application No. 16/323,571, filed as application No. PCT/KR2017/014318 on Dec. 7, 2017, now Pat. No. 11,420,497.

(30) Foreign Application Priority Data

Dec. 7, 2016 (KR) .................. 10-2016-0166078
Sep. 29, 2017 (KR) .................. 10-2017-0127580
Dec. 6, 2017 (KR) .................. 10-2017-0166685

(51) Int. Cl.
 *B60H 1/00* (2006.01)
 *B60H 1/32* (2006.01)

(52) U.S. Cl.
 CPC ........... *B60H 1/00521* (2013.01); *B60H 1/00* (2013.01); *B60H 1/00664* (2013.01);
 (Continued)

(58) Field of Classification Search
 CPC .. B60H 1/00521; B60H 1/00664; B60H 1/00; B60H 1/3203; B60H 2001/3286; B60H 2001/006; B60H 2001/00635
 See application file for complete search history.

(56) References Cited

U.S. PATENT DOCUMENTS

2003/0143941 A1 7/2003 Fujiwara
2004/0185768 A1 9/2004 Mizutani
(Continued)

FOREIGN PATENT DOCUMENTS

CN 1986264 A 6/2007
CN 103062378 A 4/2013
(Continued)

OTHER PUBLICATIONS

International Search Report and Written Opinion dated Mar. 28, 2018 from corresponding International Patent Application No. PCT/KR2017/014318 with English Translation of International Search Report and Written Opinion, 27 pages.

*Primary Examiner* — Marc E Norman
(74) *Attorney, Agent, or Firm* — Dickinson Wright PLLC

(57) ABSTRACT

The present invention relates to an air conditioner for a vehicle, which includes an air-conditioning case (200), and at least one door (100) mounted to be opened and closed at a predetermined position, wherein the door (100) is formed integrally with an arm pivot (140), and the arm pivot (140) includes a pin part, and ribs formed integrally with both sides of the pin part to reinforce rigidity of the pin part and offset noise. The air conditioner further includes distortion preventing parts formed on a rotary shaft to be dented and to be crossed to each other, thereby reducing a transformation rate of the door and securing accuracy of the pin part.

14 Claims, 10 Drawing Sheets

(52) U.S. Cl.
CPC ..... *B60H 1/3202* (2013.01); *B60H 2001/006* (2013.01); *B60H 2001/3286* (2013.01)

(56) References Cited

U.S. PATENT DOCUMENTS

| | | | |
|---|---|---|---|
| 2008/0223546 A1* | 9/2008 | Lee | B60H 1/00064 237/12.3 R |
| 2015/0038067 A1* | 2/2015 | Byon | B60H 1/00207 454/261 |
| 2017/0096045 A1 | 4/2017 | Jung et al. | |
| 2017/0282682 A1* | 10/2017 | Lee | B60H 1/26 |
| 2019/0054797 A1 | 2/2019 | Jiang et al. | |
| 2021/0283989 A1 | 9/2021 | Baron | |

FOREIGN PATENT DOCUMENTS

| | | |
|---|---|---|
| CN | 103062878 A | 4/2013 |
| CN | 103743076 A | 4/2014 |
| CN | 205022328 U | 2/2016 |
| CN | 106143063 A | 11/2016 |
| CN | 106152443 A | 11/2016 |
| DE | 102014211704 A1 | 12/2015 |
| JP | 2005219658 A | 8/2005 |
| KR | 200145276 Y1 | 6/1996 |
| KR | 2019980054257 U | 10/1998 |
| KR | 1020080060402 A | 7/2008 |
| KR | 1020130057080 A | 5/2013 |
| KR | 1020130057562 A | 6/2013 |
| KR | 1020160047039 A | 5/2016 |

\* cited by examiner

PRIOR ART

| Total : (A)0~4.258mm (B)0~3.214mm |

| X: (A)-1.640~1.310mm (B)-1.08~1.013mm |

| Y: (A)-3.840~4.055mm (B)-3.106~3.140mm |

| Z: (A)-1.315~1.378mm (B)-0.971~0.981mm |

AIR CONDITIONER FOR VEHICLE

CROSS-REFERENCE TO RELATED APPLICATIONS

This application is a divisional application of U.S. patent application Ser. No. 16/323,571, filed on Feb. 6, 2019, which is a U.S. National Stage of International Application No. PCT/KR2017/014318, filed Dec. 7, 2017, which claims the benefit and priority of KR 10-2016-0166078 filed Dec. 7, 2016, KR 10-2017-0127580 filed Sep. 29, 2017 and KR 10-2017-0166685 filed Dec. 6, 2017. The entire disclosures of each of the above applications are incorporated herein by reference.

TECHNICAL FIELD

The present invention relates to an air conditioner for a vehicle, and more particularly, to an air conditioner for a vehicle, which includes a door mounted to be opened and closed at a predetermined location of an air-conditioning case and formed integrally with an arm, thereby enhancing durability of the arm.

BACKGROUND

An air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the indoor air or the outdoor air into the air conditioner, heating or cooling the introduced air, and blowing the heated or cooled air into the vehicle.

According to mounted structures of an air blower unit, an evaporator unit and a heater core unit, such an air conditioner is classified into a three-piece type air conditioner where the air blower unit, the evaporator unit, and the heater core unit are disposed independently, a semi-center type air conditioner where the evaporator unit and the heater core unit are embedded in an air conditioning case and the air blower unit is mounted separately, and a center-mounting type air conditioner where the three units are all embedded in the air conditioning case.

As described above, the air conditioner for a vehicle is disposed in the form of an air-conditioning case. The air-conditioning case has an air inlet and an air outlet formed in an outer face thereof, and at least one air passageway formed in an inner face thereof. Air introduced into the air-conditioning case through the air inlet passes through an evaporator, a heater core and others along the air passageway, and then, is discharged to the outside of the air-conditioning case through the air outlet.

Doors for adjusting the degree of opening are disposed at the air passageway and the air outlet. The doors can control a flow of inside air of the air-conditioning case to provide the air-conditioned air to desired location and direction. The air outlet includes a defrost vent, a face vent, and a floor vent. The door includes a mode door for adjusting the degree of opening of the air outlet, and a temperature adjusting door for adjusting temperature of the air-conditioned air. The mode door includes a vent door for adjusting the degree of opening of the defrost vent and the face vent, and a floor door for adjusting the degree of opening of the floor vent.

FIG. 1 is a side view showing a part of a conventional air conditioner for a vehicle viewed from the outside. Referring to FIG. 1, the vent door 17 and the floor door 18 are controlled in their operational angle by arms 21 and 27, levers 22 and 26 and a cam 24 mounted on the outer face of an air-conditioning case 10. That is, a rotary shaft of a vent door 17 is rotatably connected to one side of the arm 21, the other side of the arm 21 is rotatably connected to one side of the lever 22, and the other side of the lever 22 is connected to a slot 23 of the cam 24.

Moreover, a rotary shaft of the floor door 18 is rotatably connected to one side of the arm 27, the other side of the arm 27 is rotatably connected to one side of the lever 26, and the other side of the lever 26 is connected to the other slot 25 of the cam 24. In this instance, when the cam 24 is rotated by operation of a controller (not shown), which is connected to a cable (not shown) and operated mechanically, the vent door 17 and the floor door 18 are also rotated.

FIG. 2 is a perspective view showing a door of the conventional air conditioner for a vehicle. As shown in FIG. 2, a vent door 17 is formed integrally with a door shaft 30. A portion 31 extended from an end portion of the door shaft 30 is capable of being hinged with respect to the case 10 by passing through a hole formed in the air-conditioning case 10. An arm 21 is fixed to an end portion 31 of the door shaft 30 on the outer face of the air-conditioning case 10. That is, in order to open and close the vent door 17, the arm 21 is rotated by a cam 24. The above may be applied to a floor door 18 in the same way.

In the conventional air conditioner for a vehicle, the cam is actuated by a driving source, driving power generated by the cam is transferred to a lever, the lever actuates the arm, and the arm is connected with a rotary shaft of the door to operate the door. So, because the lever and the arm must be mounted individually, the number of components of devices to operate the door is increased, and it causes rise in costs and generates air leak due to intervals among the devices.

Furthermore, because the vent door 17 and the arm 21 formed integrally with the door shaft 30 are manufactured as individual parts, when the vent door 17 and the arm 21 are assembled together and are actuated, the vent door 17 may not stop at a desired position due to accumulation of assembly tolerance generated during the process of assembling the vent door and the arm with each other. Additionally, the vent door 17 and the arm 21 may be vibrated within a general tolerance range, and the number of processes to assemble the components is increased, and manufacturing costs rise due to the increase of the number of the components.

Moreover, the conventional vent door has a vertically symmetric structure with respect to the door shaft 30. In this instance, if the vent door is long, since the door shaft 30 is bent in an axial direction, the door is not located at a correct location or does not secure sealability due to the bending, and it may cause a leak.

DISCLOSURE

Technical Problem

Accordingly, the present invention has been made in view of the above-mentioned problems occurring in the prior art, and it is an object of the present invention to provide an air conditioner for a vehicle, which includes an air-conditioning case, at least one door mounted to be opened and closed at a predetermined position, and an arm pivot formed integrally with door and having a pin part and ribs integrally formed at both sides of the pin part to reinforce rigidity of the pin part, thereby reinforcing rigidity of the pin part and prevent noise.

It is another object of the present invention to provide an air conditioner for a vehicle capable of preventing a leak between the door and the air-conditioning case.

It is a further object of the present invention to provide an air conditioner for a vehicle, in which distortion preventing parts concavely formed on a rotary shaft of the door are formed to cross each other in order to reduce deformation of the door and secure accuracy of the pin part, thereby securing sealability when the door actuated and preventing a leak.

Technical Solution

To accomplish the above object, according to the present invention, there is provided an air conditioner for a vehicle, which includes an air-conditioning case, and at least one door mounted to be opened and closed at a predetermined position, wherein the door is formed integrally with an arm pivot and the arm pivot includes a driving guide member, which helps driving of the door.

Moreover, the driving guide member includes a means to guide the door to slide inside an elongated hole and/or a means for preventing collision between the arm pivot and an end portion of the elongated hole.

Furthermore, the arm pivot includes a pin part protruding from the end portion of the shaft, and the driving guide member includes ribs integrally formed at both sides of the pin part to reinforce rigidity of the pin part and formed to separate the pin part from the end portion of the elongated hole at a predetermined interval.

Additionally, the ribs are formed to get narrower in the direction of the end portion of the pin part.

In addition, the air-conditioning case includes an elongated hole in which the arm pivot of the door is inserted, and the elongated hole has a curvature following a round trace formed by the arm pivot when the door rotates to open or close an outflow port of the air-conditioning case.

Moreover, the elongated hole has a spare angle added to a predetermined operational angle of the door.

Furthermore, the driving guide member includes a guide case protruding to surround a part of the arm pivot along the circumference of the elongated hole.

Additionally, the guide case protrudes to the height of the ribs of the arm pivot.

In another aspect of the present invention, the present invention provides an air conditioner for a vehicle, which includes an air-conditioning case, and at least one door mounted to be opened and closed at a predetermined position, wherein the door includes: a plate for opening and closing at least one among an air passageway and an air outflow port disposed in the air-conditioning case; a shaft formed integrally with the plate to support the plate to be able to rotate; an arm part formed integrally with the shaft, wherein at least a part of the arm part protrudes to the outside of the air-conditioning case; and leak preventing parts disposed on the arm part to prevent a leak between the door and the air-conditioning case.

Moreover, the leak preventing parts protrude from the arm part and are formed to come into contact with the air-conditioning case.

Furthermore, the air-conditioning case includes a protrusion inserted between the leak preventing parts and the arm part.

Additionally, an end portion of the leak preventing part, which comes into contact with the air-conditioning case, has an inclined surface tapered along the air-conditioning case.

In addition, the leak preventing parts are connected with a sealing part formed on an edge of the plate and are doubly injection-molded.

In a further aspect of the present invention, the present invention provides an air conditioner for a vehicle, which includes an air-conditioning case, and at least one door mounted to be opened and closed at a predetermined position, wherein the door includes a shaft and an arm pivot formed integrally with each other, and the shaft of the door has distortion preventing parts formed on one side and the other side of the shaft to be dented asymmetrically.

Moreover, a pair of plates extend to the shaft, and distortion preventing parts are formed on one side and the other side of the shaft exposed between a pair of the plates and are dented asymmetrically.

Furthermore, the distortion preventing parts include: a plurality of first distortion parts dented on one side of the shaft and a plurality of distortion preventing parts dented on the other side of the shaft. The first distortion preventing parts and the second distortion preventing parts are formed in order.

Additionally, the width of the first distortion preventing parts or the second distortion preventing parts is larger than the depth.

In addition, the distortion preventing parts are formed to be dented deeper than a central line of the shaft.

Moreover, both sides of the shaft are formed asymmetrically with respect to the center of a longitudinal direction of the door.

Furthermore, the shaft includes an arm pivot disposed at an end for regulating rotation of the door.

Additionally, the door includes the shaft, the plate and the arm pivot, which are formed integrally.

Advantageous Effects

As described above, the air conditioner for a vehicle has the structure that the door is formed integrally with the arm pivot, thereby reducing accumulation of assembly tolerance generated during the process of assembling the door and the arm with each other, and controlling increase of the number of processes for assembling components and rise of manufacturing costs of components.

Moreover, the air conditioner for a vehicle can reinforce rigidity of the pin part and reduce noise since the ribs are integrally formed at both sides of the pin part of the arm pivot.

Furthermore, the air conditioner for a vehicle can reduce noise since the ribs have inclined surfaces gradually narrowed in the direction of the end portion of the pin part and the inclined surfaces of the ribs come into contact with the end portion of an elongated hole.

Additionally, the air conditioner for a vehicle can remove causes of shock and noise since the elongated hole is formed in such a way as to add a spare angle to both sides of a portion with a predetermined operation angle of the door.

In addition, the air conditioner for a vehicle can restrain generation of noise when the ribs come into contact with the buffering member since the buffering member is disposed in the direction of the arm pivot.

Moreover, the air conditioner for a vehicle can prevent a leak due to a flow of air since the rubber member is arranged between the door and the air-conditioning case.

Furthermore, the air conditioner for a vehicle can reduce the number of components and manufacturing costs through the door unit in which the arm, the door and the shaft are formed integrally.

Additionally, the air conditioner for a vehicle can secure sealability when the door is actuated and prevent a leak since the distortion preventing parts are concavely formed on the rotary shaft of the door to cross each other in order to reduce deformation of the door and secure accuracy of the pin part.

In addition, the air conditioner for a vehicle can reduce weight of the door, reduce load of the driving means for actuating the door, and enhance operational power when a passenger manipulates the door manually.

MODE FOR INVENTION

Hereinafter, an air conditioner for a vehicle of the present invention will be described in detail with reference to the accompanying drawings.

Figure 1:
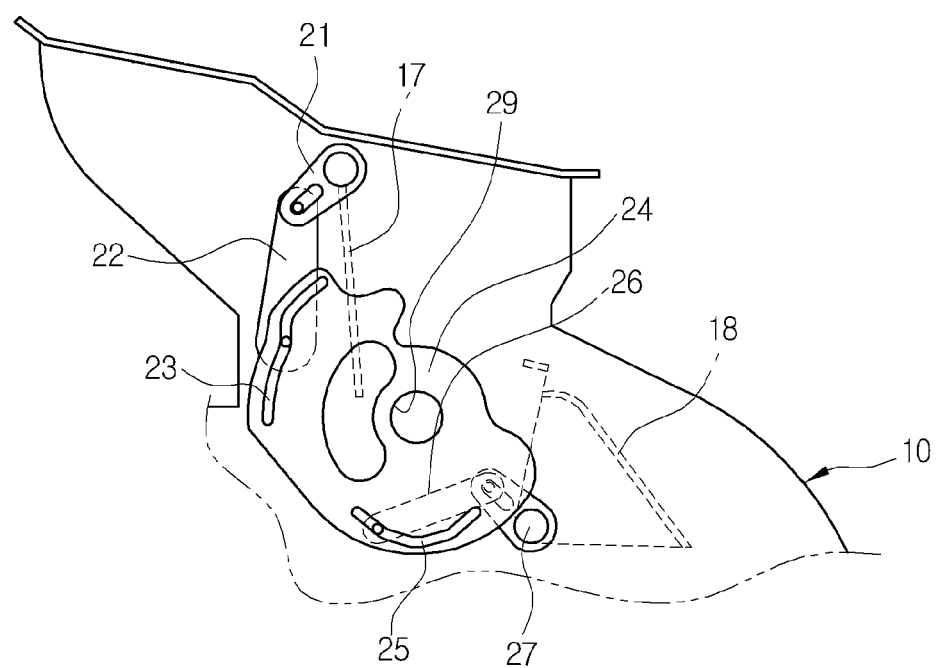
FIG. 1 is a side perspective view showing a part of a conventional air conditioner for a vehicle viewed from the outside.
Figure 2:
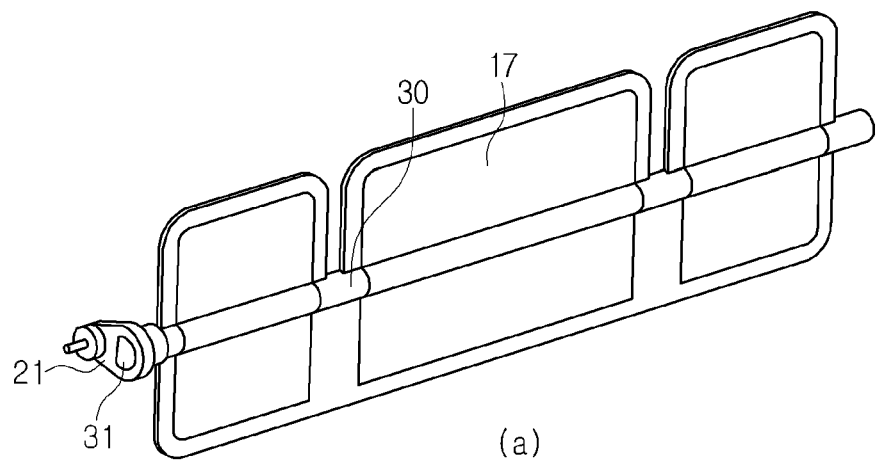
FIG. 2 is a perspective view showing a door of the conventional air conditioner for a vehicle.
Figure 2:
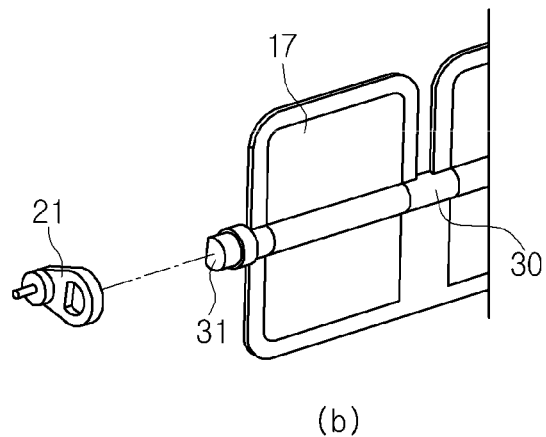
Figure 3:
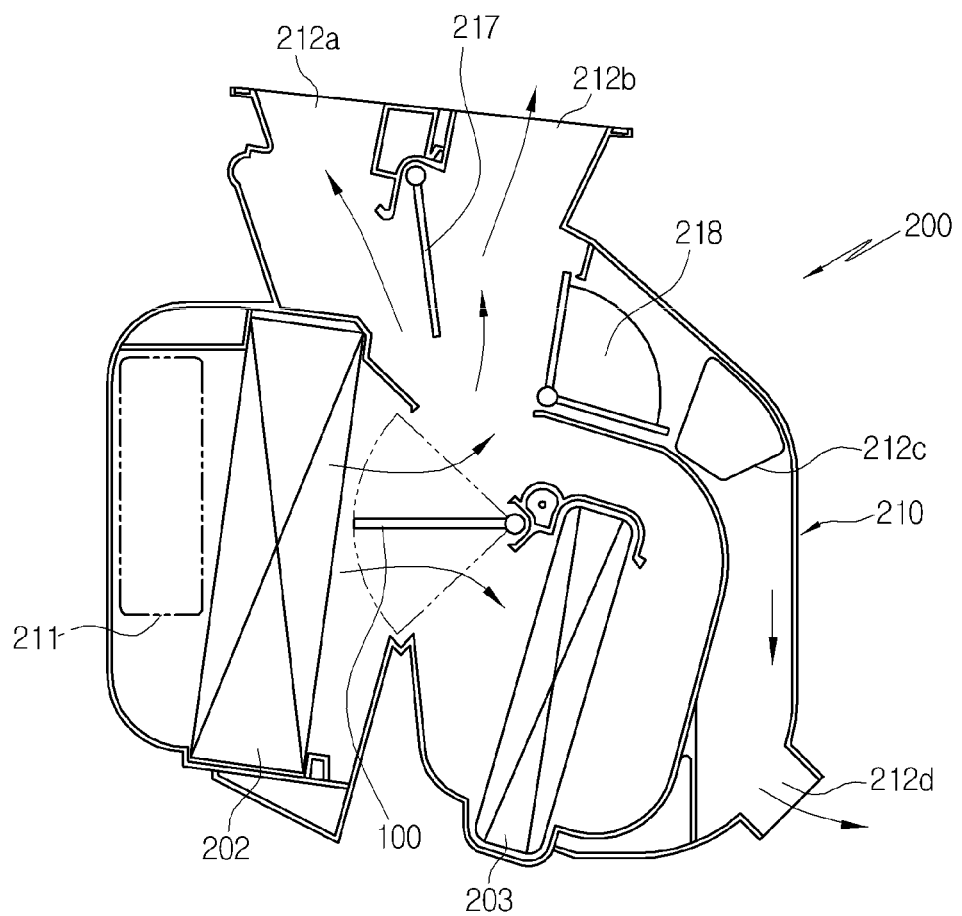
FIG. 3 is a sectional view showing an air conditioner for a vehicle according to a first preferred embodiment of the present invention.

FIG. 3 is a sectional view showing an air conditioner for a vehicle according to a first preferred embodiment of the present invention. Referring to FIG. 3, the air conditioner for a vehicle according to the first preferred embodiment of the present invention includes an air-conditioning case 200, a blower (not shown), a heat exchanger for cooling, and a heat exchanger for heating.

The air-conditioning case 200 has an air inflow port 211 formed at an inlet side, and an air outflow port formed at an outlet side. The air outflow port includes a defrost vent 212a, a face vent 212b, and floor vents 212c and 212d, which are adjusted in the degree of opening by mode doors 217 and 218. The blower is connected to the air inflow port 211 to blow indoor air or outdoor air.

The heat exchanger for cooling air and the heat exchanger for heating air are mounted inside the air-conditioning case 200. The heat exchanger for cooling may be an evaporator 202 mounted in a refrigerant circulation line. The evaporator 202 exchanges heat with air, which passes through the evaporator 202, to cool the air according to circulation of refrigerant. The heat exchanger for heating may be a heater core 203.

In this embodiment, the heat exchanger for cooling is the evaporator 202, and the heat exchanger for heating is the heater core 203. The evaporator 202 and the heater core 203 are mounted inside the air-conditioning case 200 in order. The mode door includes a vent door 216 for adjusting the degree of opening of the defrost vent 212a and the face vent 212b, and a floor door 218 for adjusting the degree of opening of the floor vents 212c and 212d.

The evaporator 202 and the heater core 203 are arranged inside the air-conditioning case 200 to be spaced apart from each other. The evaporator 202 is arranged to be adjacent to the air inflow port 211 so that the air introduced through the air inflow port 211 passes through the evaporator 202. The heater core 203 is arranged at the downstream side in an aspect of an air flow of the evaporator 202.

The blower includes an indoor air inlet and an outdoor air inlet, which are opened and closed by an indoor and outdoor air converting door, in order to selectively introduce indoor air or outdoor air. Moreover, the blower includes a blower fan disposed to end the air introduced through the indoor air inlet and the outdoor air inlet toward the air-conditioning case 200.

Furthermore, the air-conditioning case 200 has an air passageway disposed therein to regulate a flow of air. The flow of air flowing inside the air-conditioning case 200 is regulated by the air passageway, so that the air is air-conditioned by selectively passing the heater core 203.

Additionally, the air conditioner for a vehicle includes a door 100 mounted at a predetermined position of the air-conditioning case 200 to be rotatable. The door 100 is mounted to adjust the degree of opening of at least one among the air passageway and the air outflow port. In this embodiment, the door 100 is a temperature adjusting door. The temperature adjusting door adjusts the degree of opening of the air passageway, and is arranged to properly mix the air cooled by the evaporator 202 and the air heated by the heater core 203 in order to cool and heat the interior of the vehicle to proper temperature.

In case that the air conditioner is in the maximum cooling mode, the door 100 is arranged such that flowing air bypasses the heater core 203. Therefore, the air introduced into the air inflow port 211 bypasses the heater core 203 and is discharged out through the air outflow port.

Moreover, in case that the air conditioner is in the maximum heating mode, the door 100 is arranged such that the flowing air passes through the heater core 203. Therefore, the air introduced into the air inflow port 211 passes the heater core 203 and is discharged out through the air outflow port.

Figure 4:
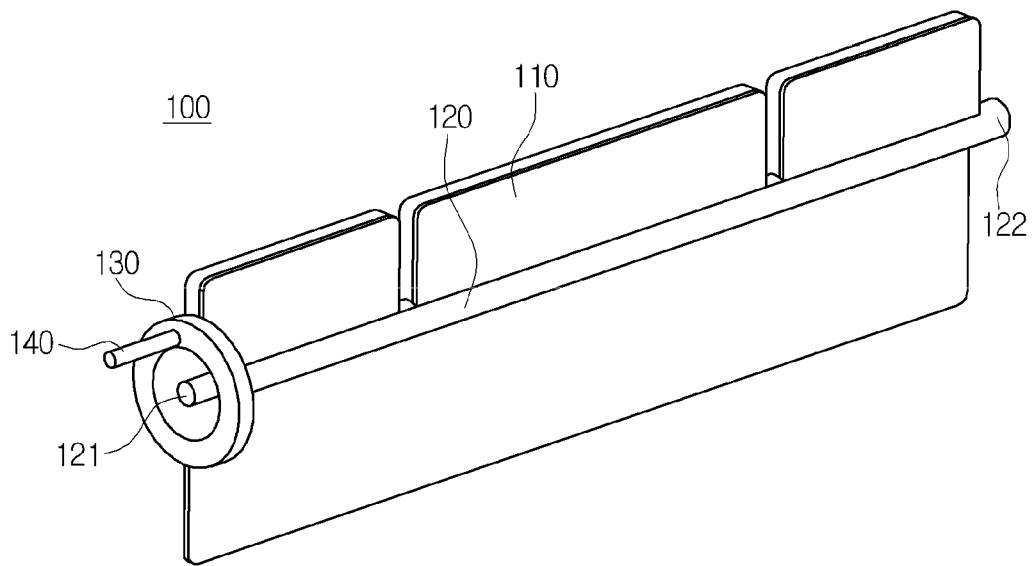
FIG. 4 is a perspective view showing a door of the air conditioner for a vehicle according to the first preferred embodiment of the present invention.

FIG. 4 is a perspective view showing the door disposed in the air conditioner for a vehicle according to the present invention.

As shown in FIG. 4, the air conditioner for a vehicle includes an air-conditioning case 200, and at least one door 100 mounted to be opened and closed at a predetermined position of the air-conditioning case 200. The door 100 includes a plate 110 and a shaft 120, which are formed integrally with each other. Furthermore, a leak preventing unit 150 for preventing an air leak from the air-conditioning case 200 is formed at an end portion 121 of the shaft 120. The leak preventing unit 150 may be a round edge with a predetermined height. An arm pivot 140 protrudes from the round edge to be formed integrally.

That is, since the door 100 according to the present invention is formed integrally with the arm pivot 140, the air conditioner can reduce accumulation of assembly tolerance generated during a process of assembling the door and the arm with each other, and prevent increase of the number of processes for assembling components and rise of manufacturing costs of the components.

In the meantime, the end portion 121 of the shaft 120 serves to make the door 100 hinged inside the air-conditioning case 200, and some or the entire of the leak preventing unit 150 is forcedly combined with the protrusion of the air-conditioning case 200 to seal the air-conditioning case 200.

Figure 5:
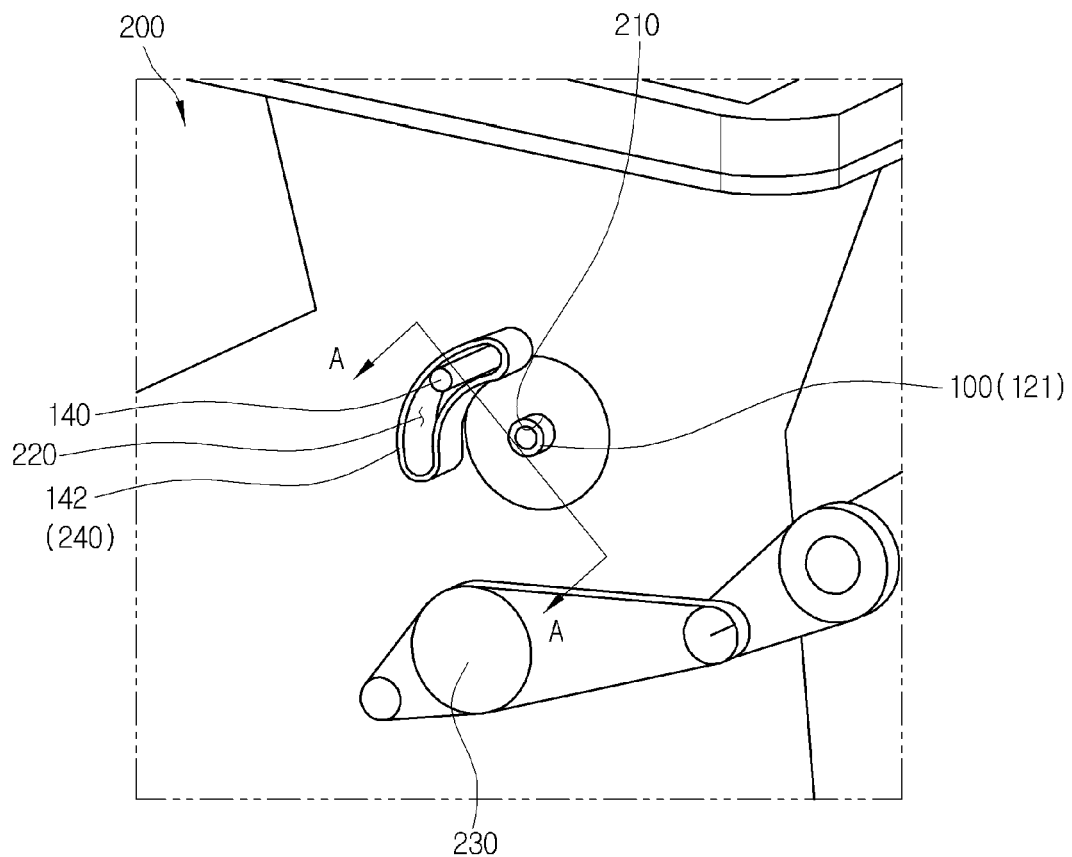
FIG. 5 is a perspective view showing a part of the air conditioner for a vehicle according to the first preferred embodiment of the present invention.

FIG. 5 is a perspective view showing a part of the air conditioner for a vehicle according to the present invention.

The air-conditioning case 200 of the air conditioner includes a hole 210 through which the end portion 121 of the door shaft 120 passes and an elongated hole 220 through which the arm pivot 140 passes are formed inside the air-conditioning case 200. In the same way, the air-conditioning case 200 further includes a hole formed in the opposite side of the air-conditioning case 200 so that the other end portion 122 of the door shaft 120 can pass through the hole.

The elongated hole 220 through which the arm pivot 140 passes is formed with a predetermined curvature along a round trace formed by the arm pivot 140 when the door 100 rotates to open and close the air outflow port.

In addition, other members for rotating the door 100, for instance, a lever 230, may be connected to the arm pivot 140 protruding outwardly from the air-conditioning case 200.

Figure 6:
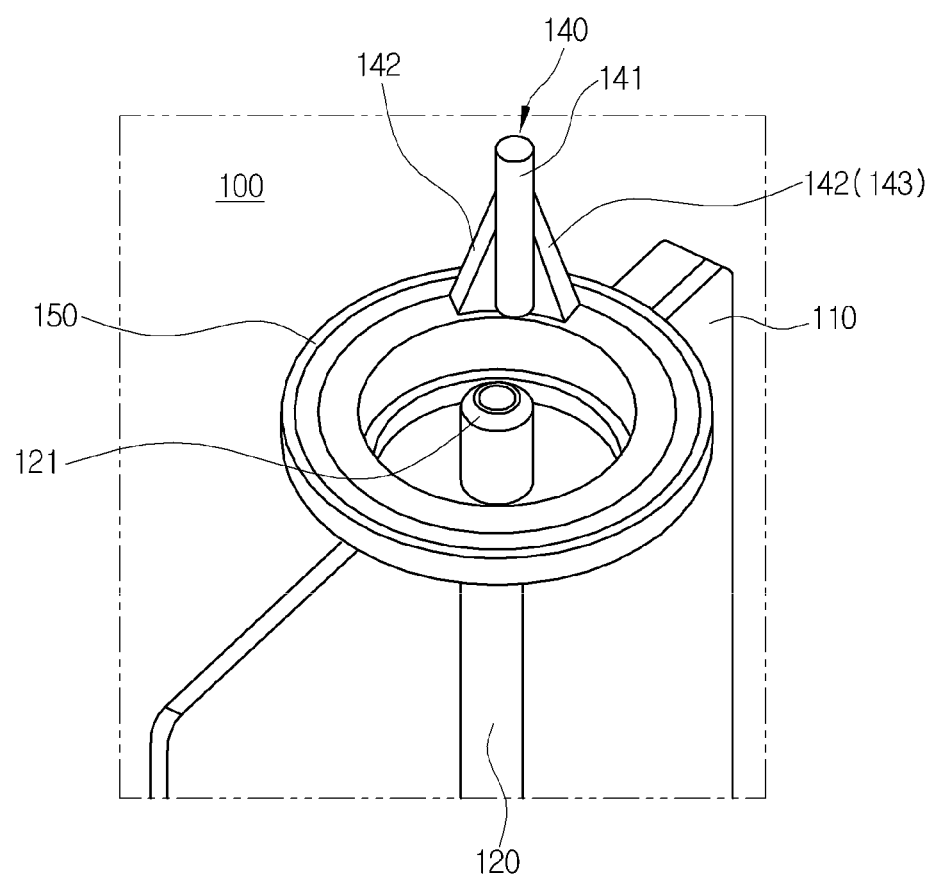
FIG. 6 is an enlarged perspective view showing a state that the door of FIG. 4 is enlarged in a direction of an end portion.

FIG. 6 is an enlarged perspective view showing a state that the door 100 of FIG. 4 is enlarged in the direction of the end portion 121.

As shown in FIG. 6, the arm pivot 140 includes a pin part 141, which is spaced apart from the end portion 121 of the shaft 120 at a predetermined interval.

Moreover, the air conditioner for a vehicle according to the present invention includes a driving guide member 142 formed to aid driving of the door 100 and promote durability of the door 100. The driving guide member 142 helps the arm pivot 140 to smoothly slide inside the elongated hole 220. Furthermore, the driving guide member 142 separates the arm pivot 140 from an end portion of the elongated hole 220 at a predetermined interval so that the arm pivot 140 is not shocked by the end portion of the elongated hole 220 even if the arm pivot 140 passes over the spare angle section.

Preferably, the driving guide member 142 includes a guide case 240 protruding along the circumference of the elongated hole 220 so that the arm pivot 140 slides inside the elongated hole 220, and ribs 143 integrally formed at both sides of the pin part 141.

In detail, the arm pivot 140 includes a pin part 141, which is spaced apart from the end portion 121 of the shaft 120 at a predetermined interval to protrude. In this instance, the driving guide member 142 includes the ribs 143 integrally formed at both sides of the pin part 141. That is, the ribs 143 of the driving guide member 142 are formed at both sides in the rotational direction of the pin part 141 to reinforce rigidity of the pin part 141 and promote durability.

That is, the arm pivot 140 aids driving of the door by the pin part 141 of the driving guide member 142 and smoothly slides inside the elongated hole 220, and is spaced apart as wide as the end portion of the elongated hole 220 and the ribs 143, so that the arm pivot can prevent shock.

Moreover, the ribs 143 are formed to be gradually narrowed in the direction of the end portion of the pin part 141. That is, each of the ribs 143 is formed to be gradually narrowed toward the upper portion so as to form an inclined surface. Therefore, the ribs 143 can promote durability of the pin part 141, and the ribs will be described in detail later.

Figure 7:
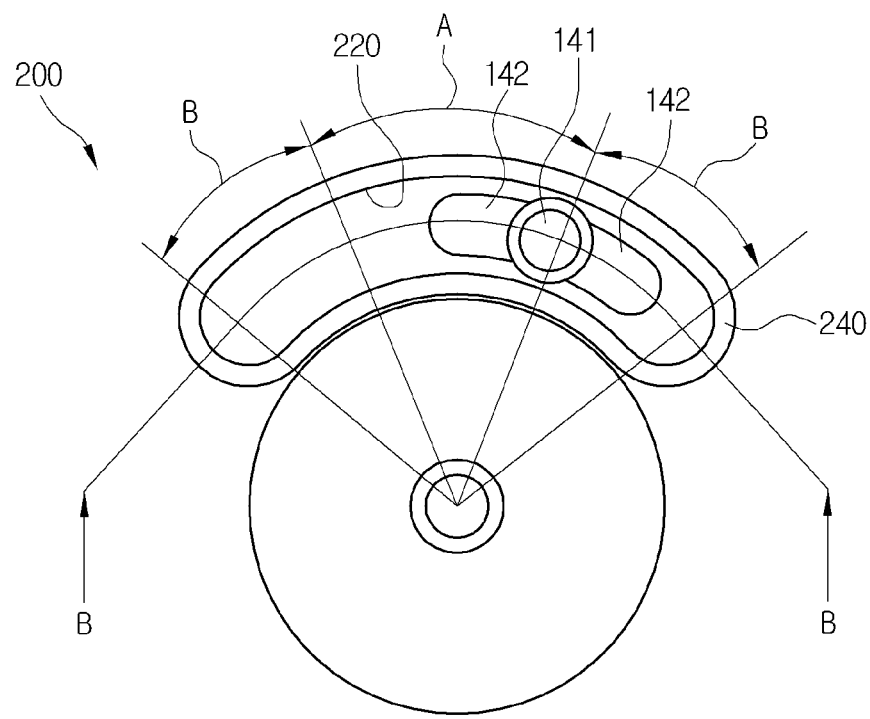
FIG. 7 is a perspective view showing a part of an air conditioner for a vehicle according to a second preferred embodiment of the present invention.

FIG. 7 is a perspective view showing a part of the air conditioner for a vehicle according to the present invention.

As shown in FIG. 7, the arm pivot 140 is fit into the elongated hole 220 of the air-conditioning case 200, and the arm pivot 140 may be rotated and/or moved within a section where the elongated hole 220 is formed.

In this instance, because the pin part 141 is not in direct contact with jaws of both end portions of the elongated hole 220 due to the ribs 143 formed at both sides of the pin part 141 of the arm pivot 140, it reinforces rigidity of the pin part 141 and enhance durability. Moreover, when the door 100 rotates strongly, if the pin part 141 directly collides against the end portion of the elongated hole 220, an unpleasant crashing sound is generated. In this instance, since the inclined surface of the rib 143 comes into contact with the end portion of the elongated hole 220 by the rib 143 formed to get upwardly narrow, the crashing sound may be offset.

Additionally, it is necessary to adjust a radius of the elongated hole 220 so that the arm pivot 140 of the door 100 does not get in contact with both end portions of the elongated hole 220. In detail, an operational angle (A) of the door 100 is a predetermined angle, and it is necessary that the elongated hole 220 is formed by adding a spare angle (B) to the operational angle (A).

In this instance, it is preferable that the spare angle (B) be set in the range of 3° to 10°. Therefore, the radius of the elongated hole 220 is set by adding more than 3° to both end portions of the operational angle (A) of the door 100, so that the arm pivot 140 touches both end portions of the elongated hole 220 to remove causes of shock and noise. In addition, if the spare angle (B) is less than 3°, as described above, the arm pivot 140 touches both end portions of the elongated hole 220 and generates shock and noise. Therefore, it is preferable that the elongated hole 220 be formed to be more spare at a predetermined angle than the predetermined operational angle (A) of the door 100.

Figure 8:
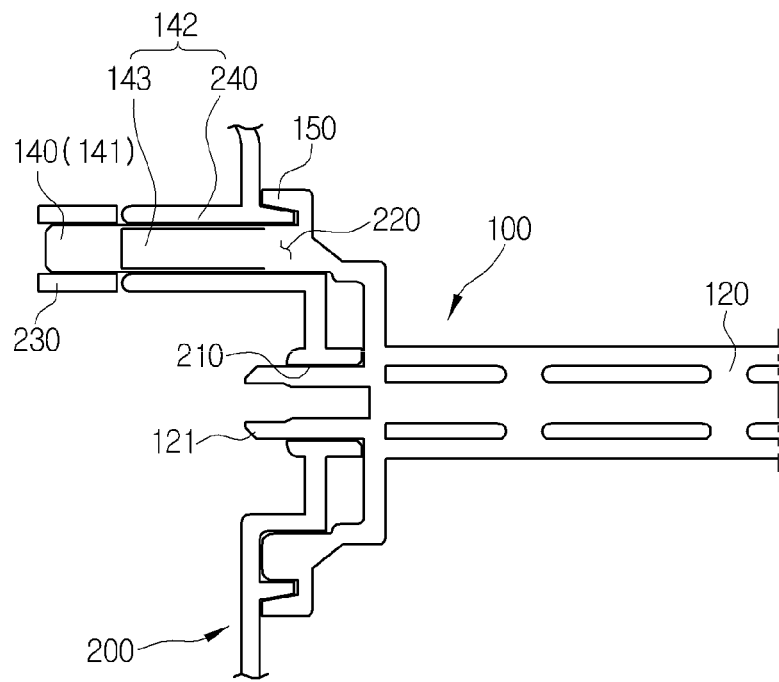
FIG. 8 is a sectional view taken along the line of A-A of FIG. 5.

FIG. 8 is a sectional view taken along the line of A-A of FIG. 5.

As shown in FIG. 8, the end portion 121 of the door 100 is rotatably fit into the hole 210 of the air-conditioning case 200, and the arm pivot 140 of the door 100 is slidably fit into the elongated hole 220. In this instance, the driving guide member 142 includes a guide case 240 protruding along the circumference of the elongated hole 220 to surround a part of the arm pivot 140. Preferably, the guide case 240 of the driving guide member 142 protrudes to the height of the ribs 143 of the arm pivot 140.

The guide case 240 can minimize an air leak from the inside of the air-conditioning case 200 and guides movement of the arm pivot 140.

Moreover, the pin part 141 excluding the ribs 143 protrudes from the guide case 240, and for instance, the lever 230 is fit to the pin part 141, and it does not limit the present invention.

Figure 9:
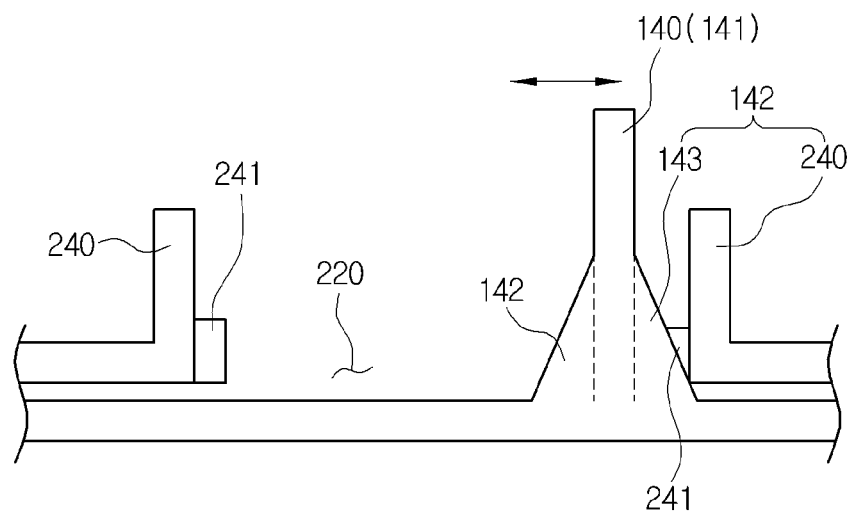
FIG. 9 is a sectional view taken along the line of B-B of FIG. 7.

FIG. 9 is a sectional view taken along the line of B-B of FIG. 7.

As shown in FIG. 9, the arm pivot 140 slides inside the elongated hole 220, and in this instance, in order to provide a buffering function and remove noise at a point where the ribs 143 of the arm pivot 140 get in contact with the guide case 240, the guide case 240 may include a buffering member 241 disposed in the direction of the arm pivot 140. Therefore, when the arm pivot 140 moves to slide and rotate, the ribs 143 come into contact with the buffering member 241 to prevent generation of noise.

Figure 10:
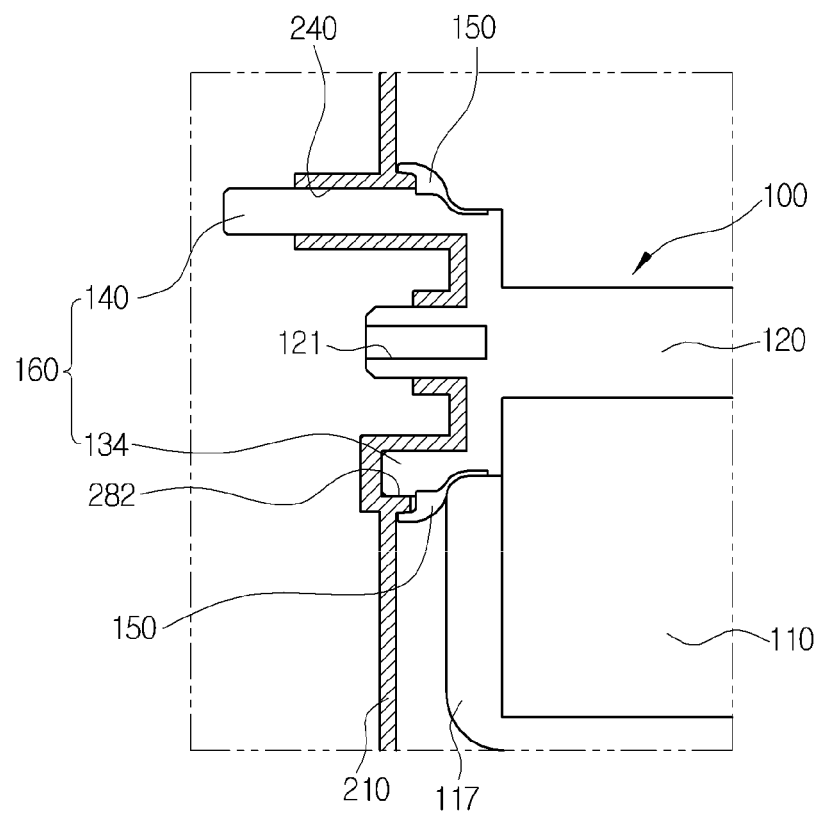
FIG. 10 is a view showing a state that a door unit and an air-conditioning case of the air conditioner for a vehicle according to the second preferred embodiment are combined with each other.

FIG. 10 is a view showing a state that the door unit and the air-conditioning case are combined with each other. In this instance, for the sake of convenience in description, combination between one side of the door 100 and the air-conditioning case 200 is illustrated in cross section. The other side of the door 100 may be also combined with the air-conditioning case 200.

The door 100 has a structure that a plate 110, a shaft 120, and an arm part 160 are formed integrally with each other. That is, the door 100 is an arm integrated door.

The plate 110 opens and closes at least one among an air passageway and an air outflow port disposed inside the air-conditioning case 200. When the door 100 rotates, the plate 110 is also rotated and opens or closes the air passageway and the air outflow port to control a flow of air.

The shaft 120 is formed integrally with the plate 110 and supports the plate 110 to be able to rotate. The end portion 121 of the shaft 120 is rotatably seated in the air-conditioning case 200.

The arm part 160 is formed integrally with the shaft 120, and at least a portion of the arm part 160 includes an arm pivot 140 protruding outwardly from the air-conditioning case 200 and a second arm part 134 rotatably inserted into a rotary hole 282 formed in the air-conditioning case 200. The second arm part 134 is rotatably fit and combined with the rotary hole 282 of the air-conditioning case 200 to seal the air-conditioning case 200.

The arm pivot 140 protruding outwardly from the air-conditioning case 200 is connected with a driving source, which actuates the door 100. For instance, the arm pivot 140 may be connected with a motor through a lever and a cam.

The air-conditioning case 200 has an arm hole formed in correspondence with a rotational trace of the arm part 160 and the arm pivot 140 and the second arm part 134 are seated in the arm hole. The arm hole includes a guide case 240 formed in the air-conditioning case 200 to guide rotation of the arm pivot 140 and restrict a rotational radius of the arm pivot 140, and a rotary hole 282 for guiding rotation of a tangent face of the second arm part 134.

Here, the second arm part 134 is spaced apart from the end portion 121 of the shaft 120, and the arm pivot 140 is spaced apart from the end portion 121 of the shaft in the opposite direction to the second arm part 134.

Now, operation of the door 100 will be described. The arm pivot 140 receiving driving power from the driving source is guided along the guide case 240 to rotate. Likewise, the second arm part 134 is guided along the rotary hole 282 to rotate. Therefore, the shaft 120 is rotated and the plate 110 is moved to open or close the air passageway or the air outflow port. As described above, the door 100 in which the plate 110, the shaft 120 and the arm part 160 are formed integrally provides convenience in operation.

Figure 11:
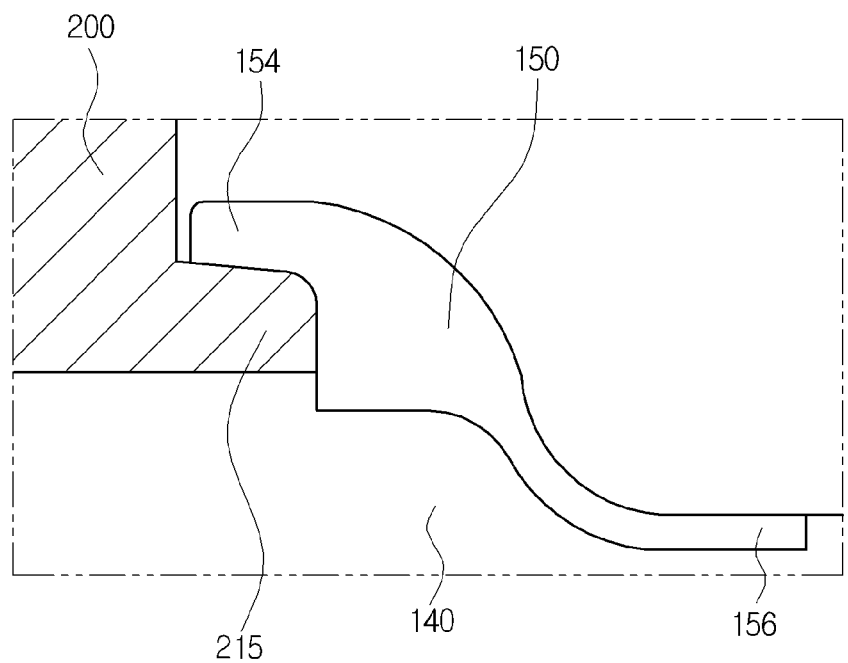
FIG. 11 is a view showing a leak preventing unit 150 of the air conditioner for a vehicle according to the second preferred embodiment are combined with each other.

FIG. 11 is a view showing a leak preventing part 150 of the air conditioner for a vehicle according to a second preferred embodiment of the present invention. FIG. 11 is an enlarged view of FIG. 10 in order to show the cross section of the leak preventing part 150 in detail.

The door 100 includes the leak preventing part 150 for preventing a leak between the door 100 and the air-conditioning case 200. The leak preventing part 150 is combined with the arm part 160. That is, the leak preventing part 150 may be formed in a ring shape surrounding the arm part 160. In this instance, the thickness of the leak preventing part 150 is less than 1 mm.

The leak preventing part 150 is connected with a sealing part 117 (see FIG. 10) formed at an edge of the plate 110, and preferably, is doubly injection-molded.

One side 156 of the leak preventing part 150 is combined with the arm pivot 140 of the arm part 160, and the other side 154 is extended to get in contact with the air-conditioning case 200. Hereinafter, an end portion getting in contact with the air-conditioning case 200 is a first end portion 154, and an end portion combined with the arm part 160 is a second end portion 156.

Moreover, the air-conditioning case 200 includes a protrusion 205 inserted between the leak preventing part 150 and the arm part 160. In this instance, the first end portion 154 and the protrusion 205 come into contact with each other to promote durability.

The first end portion 154 of the leak preventing part 150 getting in contact with the air-conditioning case 200 may have a shape corresponding to the shape of the air-conditioning case 200. That is, the first end portion 154 may have a rectangular shape corresponding to the shape of the air-conditioning case 200, which is bent at 90 degrees according to the shape of the protrusion 205. Such form increases a contact area between the air-conditioning case 200 and the leak preventing part 150 to effectively prevent an air leak.

Figure 12:
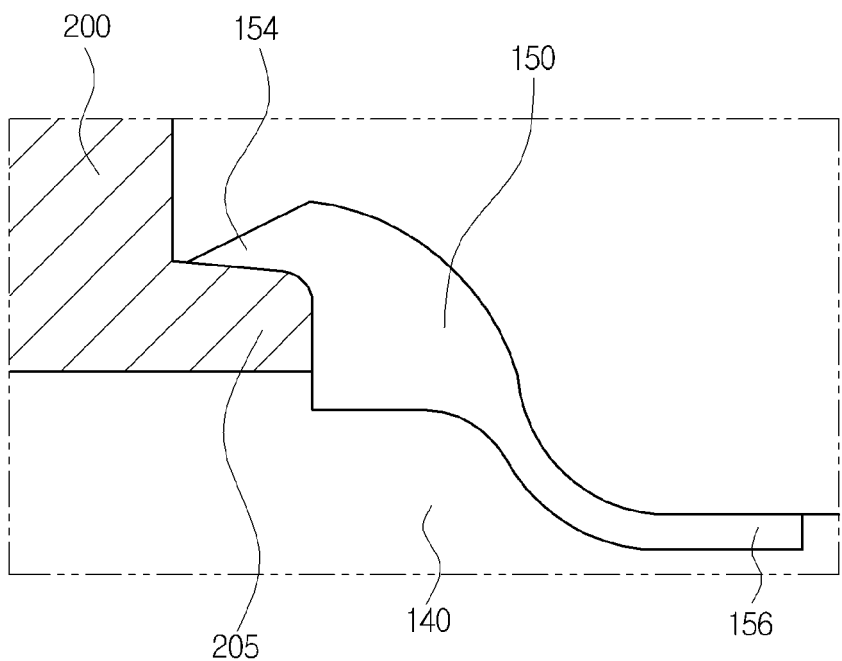
FIG. 12 is a view showing a sealing member of the air conditioner for a vehicle according to the second preferred embodiment are combined with each other.

FIG. 12 is a view showing a sealing member of the air conditioner for a vehicle according to the second preferred embodiment of the present invention.

Referring to FIG. 12, the first end portion 154 of the sealing member 150 getting in contact with the air-conditioning case 200 may be formed to have an inclined surface tapered along the air-conditioning case 200. That is, the first end portion 154 gets outwardly thinner. Such a form can reduce material costs and enhance contact force.

Figure 13:
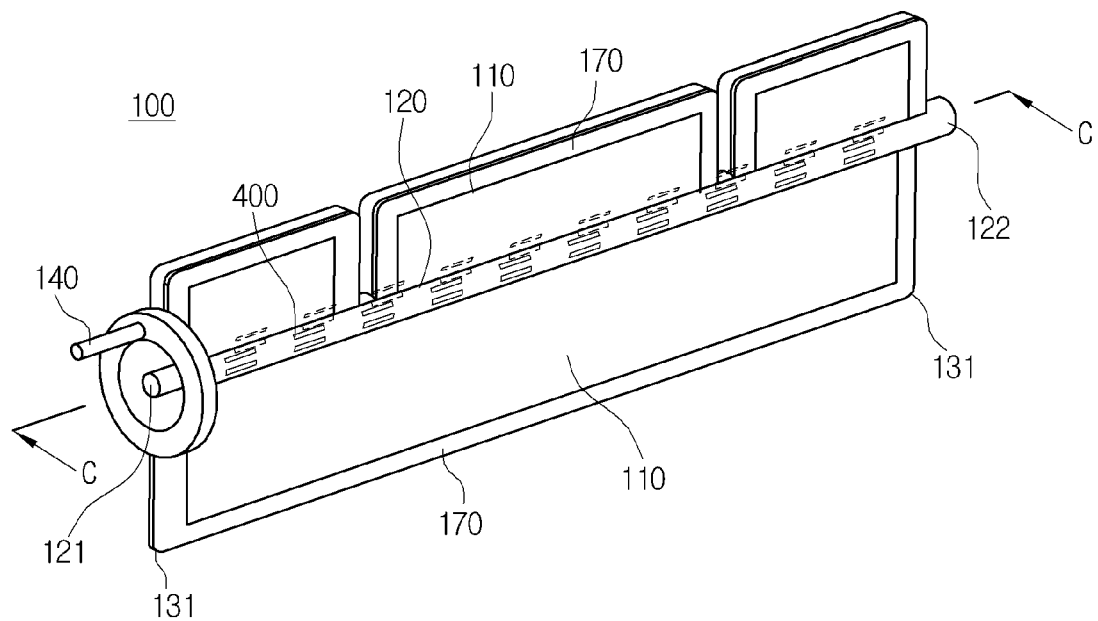
FIG. 13 is a perspective view showing the door of the air conditioner for a vehicle according to the present invention.
Figure 14:
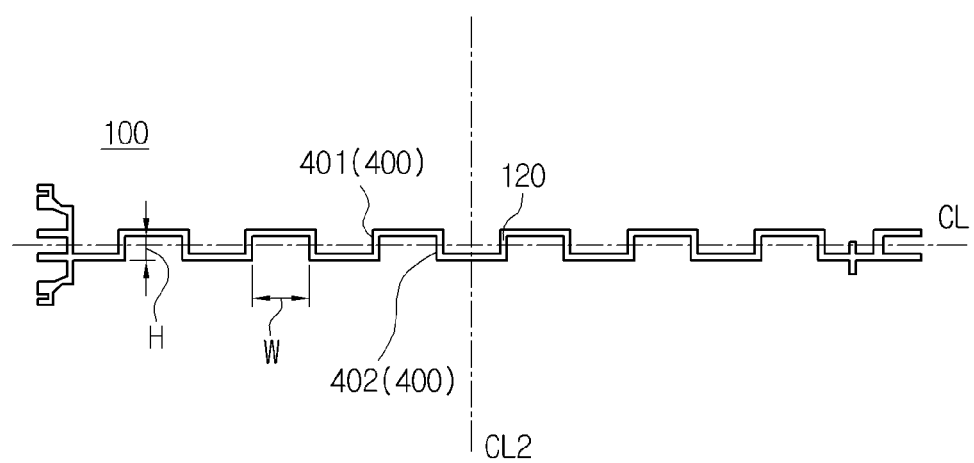
FIG. 14 is a sectional view taken along the line of C-C of FIG. 13.

FIG. 13 is a perspective view showing the door of the air conditioner for a vehicle according to the present invention, and FIG. 14 is a sectional view taken along the line of C-C of FIG. 13.

As shown in FIG. 13, the door 100 of the air conditioner includes a shaft 120, a plate 110, and a rubber member 170. In this instance, the plate 110 is made of a resin material, and the rubber member 170 is made of a rubber material. The plate 110 and the rubber member 170 may be formed integrally by double injection molding, or may be combined with each other through assembly.

Moreover, the door 100 may be formed asymmetrically in such a way as to have an arm pivot 140 at one side of the shaft 120 to regulate rotation of the door 100 and not to have a rotation regulating means at the other side. That is, the shaft 120 of the door 100 has the arm pivot 140, which is a means for regulating rotation of the door 100, only at one end. It means that the door 100 is formed asymmetrically with respect to a central line CL2 (see FIG. 14) in the horizontal direction of the door 100.

Furthermore, since the door 100 has the shaft 120, the plate 110 and the arm pivot 140 which are formed integrally, the air conditioner can reduce accumulation of assembly tolerance generated during a process of assembling the door and the arm with each other, and prevent increase of the number of processes for assembling components and rise of manufacturing costs of the components.

In this instance, differently from the conventional method to regulate at both sides, the door 100 is rotated by the arm pivot 140 formed at one side. When control power is applied to the arm pivot 140, since bending moment is applied to the door 100, it causes transformation, so it is very sensitive to accuracy of the position controlled by the arm pivot 140.

The plate 110 adjusts the degree of opening of a passage inside the air-conditioning case 200, and is formed integrally with the outer circumferential surface of the shaft 120. In this instance, the plate 110 may be formed only at one side of the shaft 120, or may be formed at both sides.

The rubber member 170 is made of a rubber material to resiliently come into contact with the inner face of the air-conditioning case 200 and enhance sealability when the door 100 is rotated, and is doubly injection-molded at an edge of the plate 110.

In the meantime, the edge of the plate 110 has a round portion with a predetermined radius, and also the edge of the rubber member 170 corresponding to the round part of the plate 110 has a round portion 131 with a predetermined radius. Additionally, the plate 110 has a cut groove (not shown) dented to a predetermined depth to reduce thickness of the plate 110 and also reduce weight and manufacturing costs.

As shown in FIG. 14, distortion preventing parts 400 are formed on the shaft 120 of the door 100 to be crossed in order to minimize transformation of the door 100. Therefore, it can minimize an error in position of the arm pivot 140, which sensitively acts to transformation of the door 100, to secure accuracy of the arm pivot 140 and prevent an air leak.

In detail, the distortion preventing parts 400 are injection-molded to be dented in the shaft 120. Conventionally, the distortion preventing parts 400 are formed side by side at one side or are dented and injection-molded to be vertically symmetrical.

However, in the present invention, the distortion preventing parts 400 are dented in the shaft 120 to be vertically asymmetrical. That is, as shown in FIG. 14, the distortion preventing parts 400 includes a first distortion preventing part 401 dented from the upper surface of the shaft 120 and a second distortion preventing part 402 dented from the lower surface of the shaft 120. The first distortion preventing part 401 and the second distortion preventing part 402 are not vertically symmetrical but are formed in a stepwise manner. Here, the upper surface means an upper part in FIG. 14, and is one side exposed between a pair of the plates 110 extending to the shaft 120, and the lower surface means the other side exposed between a pair of the plates 110 extending downwardly from the shaft 120.

That is, the first distortion preventing part 401 and the second distortion preventing part 402 are formed asymmetrically, and as an example, the first distortion preventing part 401 and the second distortion preventing part 402 are formed on the shaft 120 in the stepwise manner.

In this instance, because the first distortion preventing part 401 and the second distortion preventing part 402 are formed side by side in order, the distortion preventing parts 400 may be formed deeper than the vertical central line CL of the door 100. FIG. 14 illustrates that the central line CL is a horizontal line extending along the axial center of the shaft 120.

Moreover, a width (W) of the first distortion preventing part 401 or the second distortion preventing part 402 is larger than a depth (H).

Therefore, the air conditioner for a vehicle can reduce weight of the door, reduce load of the driving means for actuating the door, and enhance operational power when a passenger manipulates the door manually.

Experimental Example

Figure 15:
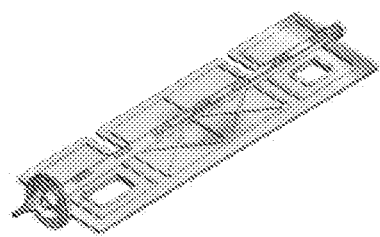
FIG. 15 is a view for explaining an experimental example of the present invention.
Figure 15:
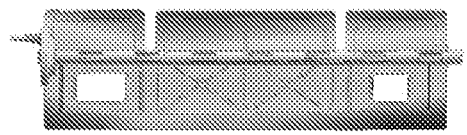
Figure 15:
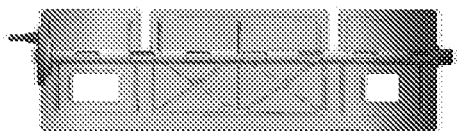
Figure 15:

Hereinafter, transformation rates of the conventional door A and the door B of the present invention were compared through an experiment of the Table 1, and it was confirmed that the door according to the present invention was higher in improvement rate than the conventional door. In the experiment, the same pressure was applied to the conventional door A and the door B of the present invention in X, Y, and Z directions under the same conditions, and transformation rates of the doors were measured. Here, except the distortion preventing parts, the components of the conventional door A and the door B of the present invention had the same size, height and width. The conventional door A had the distortion preventing parts, which were dented symmetrically on the rotary shaft, but the door B of the present invention had the distortion preventing parts, which were formed asymmetrically, and the distortion preventing part formed on the upper surface and the distortion preventing part formed on the lower surface were dented in order. In addition, in the experiment, the X, Y, and Z directions are illustrated in FIG. 15.

|  | Conventional door (A) | Door (B) of the present invention |
|---|---|---|
| X-direction transformation | −1.640~1.310 mm | −1.08~1.013 mm |
| Y-direction transformation | −3.840~4.055 mm | −3.106~3.140 mm |
| Z-direction transformation | −1.315~1.378 mm | −0.971~0.981 mm |
| Total transformation | 0~4.258 mm | 0~3.214 mm |

As you can see in the experiment, compared with the conventional door, the door according to the present invention was improved up to 25% in transformation improvement rate with respect to the total transformation.

As described above, the door 100 of the air conditioner for a vehicle according to the present invention has the distortion preventing parts 400 formed on the shaft 120 during the injection-molding process of the shaft 120 and the plate 110 of the door 100, and then, the rubber member 170 is doubly injection-molded at the end portion of the edge of the plate 110.

In this instance, the distortion preventing parts 400 of the door 100 are arranged on the shaft 120 to be crossed in the stepwise manner in order to reduce the transformation rate of the door 100 and enhance accuracy of products.

The door 100 is mounted in a specific passage in the air-conditioning case 200 to adjust the degree of opening of the corresponding passage. In this instance, the air conditioner can secure sealability and prevent a leak when the door 100 is actuated since minimizing transformation of the door 100 and securing accuracy of the arm pivot 140.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims.

What is claimed is:

1. A door for an air conditioner for a vehicle, wherein the air-conditioner includes an air-conditioning case, wherein the door is mounted to the air-conditioning case to be moved to predetermined positions, and wherein the door comprises:
   a plate for opening and closing at least one among an air passageway and an air outflow port disposed in the air-conditioning case;
   a shaft connected to the plate and rotatable about an axis for rotating the plate;
   an arm part connected to the shaft, wherein at least a part of the arm part is configured to protrude through the air-conditioning case an outside of the air-conditioning case; and
   a leak preventing part disposed on the arm part to prevent a leak between the door and the air-conditioning case.

2. The door according to claim 1, wherein the leak preventing part extends annularly about the axis.

3. The door according to claim 2, wherein the leak preventing part is located along an outer perimeter of the arm part.

4. The door according to claim 1, wherein the leak preventing part protrudes from the arm part and is formed to come into contact with the air-conditioning case.

5. The door according to claim 1, wherein the air-conditioning case includes a protrusion located between the leak preventing part and the arm part.

6. The door according to claim 5, wherein the protrusion is located radially between the leak preventing part and the arm part.

7. The door according to claim 6, wherein an end portion of the leak preventing part, which comes into contact with the air-conditioning case, has an inclined surface tapered along the air-conditioning case.

8. The door according to claim 1, wherein the leak preventing part is connected with a sealing part formed on an edge of the plate and is doubly injection-molded.

9. The door according to claim 1, wherein the shaft is formed integrally with the plate.

10. The door according to claim 1, wherein the arm part is formed integrally with the shaft.

11. The door according to claim 1, wherein the leak preventing part is axially shorter than the arm part.

12. The door according to claim 1, wherein the arm pivot includes a pin part protruding from a location adjacent to an end of the shaft for being received by an elongated hole in the air-conditioning case.

13. The door according to claim 12, wherein the leak preventing part extends annularly about the axis radially outside of the pin part.

14. The door according to claim 12, wherein the leak preventing part is axially shorter than the pin part and an end of the shaft in a direction toward the air conditioning case.

* * * * *